(12) United States Patent
Wang et al.

(10) Patent No.: US 9,513,442 B2
(45) Date of Patent: Dec. 6, 2016

(54) HIGH DENSITY OPTICAL FIBER SWITCH MODULE

(75) Inventors: Qiyue Wang, Guangdong (CN); Guo Yang, Guangdong (CN)

(73) Assignee: Sunsea Telecommunications Co., LTD (CN)

( * ) Notice: Subject to any disclaimer, the term of this patent is extended or adjusted under 35 U.S.C. 154(b) by 247 days.

(21) Appl. No.: 14/233,937

(22) PCT Filed: Jul. 22, 2011

(86) PCT No.: PCT/CN2011/077513
§ 371 (c)(1),
(2), (4) Date: Mar. 10, 2014

(87) PCT Pub. No.: WO2013/013372
PCT Pub. Date: Jan. 31, 2013

(65) Prior Publication Data
US 2014/0169732 A1    Jun. 19, 2014

(51) Int. Cl.
*G02B 6/38* (2006.01)
*G02B 6/35* (2006.01)
*G02B 6/40* (2006.01)

(52) U.S. Cl.
CPC .............. *G02B 6/35* (2013.01); *G02B 6/3897* (2013.01); *G02B 6/406* (2013.01); *G02B 6/3825* (2013.01)

(58) Field of Classification Search
None
See application file for complete search history.

(56) References Cited

U.S. PATENT DOCUMENTS

| 6,467,971 B1* | 10/2002 | Carberry | G02B 6/3897 385/58 |
| 6,621,974 B1* | 9/2003 | Chu | G02B 6/4441 385/135 |
| 6,632,023 B1* | 10/2003 | Ogawa | G02B 6/3825 385/53 |
| 2002/0141738 A1* | 10/2002 | Yagi | G11B 20/10527 386/241 |

(Continued)

FOREIGN PATENT DOCUMENTS

| CN | 2514623 | 10/2002 |
| CN | 101295059 | 10/2008 |

(Continued)

OTHER PUBLICATIONS

Extended European Search Report of European Applicaiton No. 11870138.2, Feb. 26, 2015.

*Primary Examiner* — Charlie Y Peng
(74) *Attorney, Agent, or Firm* — Jack Schwartz & Associates, PLLC

(57) ABSTRACT

A high density optical fiber switch module comprises a box body whose front end is provided with several optical fiber adapters, the top surface or bottom surface of the optical fiber adapter is provided with a first positioning groove which extending along the direction perpendicular to a direction in which the optical fiber plug is inserted into the optical fiber adapter, and a first positioning protrusion matching with the first positioning groove is arranged on the inner surface of the box body so that when the first positioning protrusion is latched within the first positioning groove, the optical fiber adapter is fixed to the front end of the box body.

9 Claims, 3 Drawing Sheets

(56) References Cited

U.S. PATENT DOCUMENTS

| | | | |
|---|---|---|---|
| 2006/0140542 A1* | 6/2006 | Koreeda | G02B 6/3825 385/53 |
| 2010/0142910 A1* | 6/2010 | Hill | G02B 6/4454 385/135 |
| 2010/0322576 A1 | 12/2010 | Rhoney et al. | |
| 2010/0322583 A1 | 12/2010 | Cooke et al. | |
| 2011/0044589 A1 | 2/2011 | Takaoka et al. | |
| 2014/0072263 A1* | 3/2014 | Hung | G02B 6/3825 385/60 |
| 2014/0220794 A1* | 8/2014 | Taylor | H04Q 1/13 439/55 |

FOREIGN PATENT DOCUMENTS

| | | |
|---|---|---|
| JP | 8122574 | 5/1996 |
| JP | 2000347070 | 12/2000 |
| JP | 2005156603 | 6/2005 |
| JP | 2011191333 | 9/2011 |

* cited by examiner

HIGH DENSITY OPTICAL FIBER SWITCH MODULE

TECHNICAL FIELD

The present invention relates to physical connections for optical communication, and in particular to a high density optical fiber switch module.

TECHNICAL BACKGROUND

Internet and wireless technologies, which have significantly enhanced the capability of information interconnection, are evolved by an exponential factor globally to support network traffic flows for hundreds of millions of users, and billions of digital data are transmitted globally through switches, long-range optical fibers, Metropolitan Area Networks, and various access technologies. Generally, connectors are employed for the connection between optical fibers and the connection between optical fibers and devices. Due to the rapid increase of information interconnections, the density of optical fiber connections is increasingly improved, that is, more and more optical fiber connections are implemented within a unit of volume.

In some cases such as a data center, optical fiber switch modules are used for the conversion from Multi-fiber Termination Push-on (MTP) connectors to duplex Lucent Connectors (LC connectors). The optical fiber switch module is provided with a duplex LC adaptor at its front panel, and provided with an MTP connector at its rear panel. The connection density of the optical fiber switch module mainly depends on the size and assembly structure of the duplex LC adaptor. The duplex LC adaptor of the existing optical fiber switch module is provided with an elastic latching arm, while the box body of the optical fiber switch module is provided with a latching recess matching with the latching arm, so that the duplex LC adaptor may be attached to the front panel of the optical fiber switch module through the coupling between the elastic latching arm and the latching recess. The elastic latching arm enlarges the size of the duplex LC adaptor and hence decreases the connection density of the optical fiber switch module, further, the attached duplex LC adaptor is allowed for a certain movement clearance because the latching arm is elastic.

SUMMARY OF THE INVENTION

The technical problem of the present invention to be solved is to provide a high density optical fiber switch module in view of the above-described defects of the existing optical fiber switch module in the prior art, to significantly improve the density of optical fiber connections.

The technical solution to solve the technical problem of the present invention includes: a high density optical fiber switch module including a box body, where at least one optical fiber adaptor is arranged at the front end of the box body, a first positioning groove is provided on a top or bottom surface of the optical fiber adaptor and extended along a direction that is perpendicular to a direction in which an optical fiber plug is inserted into the optical fiber adaptor, and a first positioning protrusion matching with the first positioning groove is provided on the inner surface of the box body, so that the optical fiber adaptor is fixed at the front end of the fox body when the first positioning protrusion is latched within the first positioning groove.

In the high density optical fiber switch module of the invention, the box body includes a base housing and a cover detachably connected with the base housing. The base housing includes a base plate, and a left side wall and a right side wall which are arranged opposite to each other on both lateral sides of the base plate. A transverse barrier bar, which is connected to the left and right side walls and parallel to the base plate, is arranged at the front end of the base housing, so that the optical fiber adaptor is accommodated between the transverse barrier bar and the base plate.

In the high density optical fiber switch module of the invention, a vertical barrier plate separating the optical fiber adaptors is arranged between the transverse barrier bar and the base plate.

In the high density optical fiber switch module of the invention, stop steps are arranged on the top surface and the bottom surface of the optical fiber adaptor, respectively, where the stop step on the top surface is adapted to abut against the end face of the transverse barrier bar, and the stop step on the bottom surface is adapted to abut against the end face of the base plate.

In the high density optical fiber switch module of the invention, the first positioning groove is located on the top surface of the optical fiber adaptor, and the first positioning protrusion is located on the inner surface of the cover.

In the high density optical fiber switch module of the invention, the cross section of the first positioning groove has a shape of right-angled trapezoid, a lateral side of which that is close to the front end of the optical fiber adaptor is a sloped side, and the cross section of the first positioning protrusion has a shape of right-angled trapezoid.

In the high density optical fiber switch module of the invention, the cover and the base housing are coupled in a snap locking manner. Particularly, latching slots are provided at both lateral sides of the cover, and latching hooks matching with the latching slots are provided at both lateral sides of the base housing, so that the latching hooks are configured to be locked in the latching slots.

In the high density optical fiber switch module of the invention, an additional second positioning groove may be arranged on the bottom surface of the optical fiber adaptor and an additional second positioning protrusion matching with the second positioning groove is correspondingly arranged on the inner surface of the base plate of the base housing, where the second positioning groove and the first positioning groove are arranged alternately.

In the high density optical fiber switch module of the invention, the optical fiber adaptor is provided with a plurality of sockets for receiving optical fiber plugs.

In the high density optical fiber switch module of the invention, the optical fiber plugs are dual-core optical fiber plugs.

The high density optical fiber switch module of the invention is advantageous as follows. In the optical fiber switch module of the present invention, the positioning groove is arranged on the surface of the optical fiber adaptor, and the positioning protrusion matching with the positioning groove is correspondingly arranged on the inner surface of the box body of the optical fiber switch module, so that the optical fiber adaptor may be fixedly attached when the positioning protrusion is latched within the positioning groove. Because the optical fiber adaptor does not include any connecting flange or elastic latching arm, the size of the optical fiber adaptor may be effectively reduced, thereby improving the density of optical fiber connections.

DESCRIPTION OF DRAWINGS

The present invention will be further described in detail below with reference to the accompanying drawings and embodiments, where.

DETAILED DESCRIPTION OF THE PREFERRED EMBODIMENT

In the optical fiber switch module of the present invention, optical fiber adaptors without flange structures are employed for improving the density of optical fiber connections, that is, a positioning groove is arranged on at least one of top and bottom surfaces of the optical fiber adaptor, and a positioning protrusion matching with the positioning groove is correspondingly arranged on the inner surface of the box body of the optical fiber switch module, so that the optical fiber adaptor may be fixedly attached by the coupling between the positioning groove and the positioning protrusion. Because the optical fiber adaptor does not include any peripheral connecting flange or elastic latching arm, the size of the optical fiber adaptor may be effectively reduced, so that more optical fiber adaptors may be arranged in the same area on the panel, thereby improving significantly the density of optical fiber connections.

Particular embodiments of the present invention will be described below with reference to the accompanying drawings in detail, to make the technical features, objects and effects of the invention more apparent.

Figure 1:
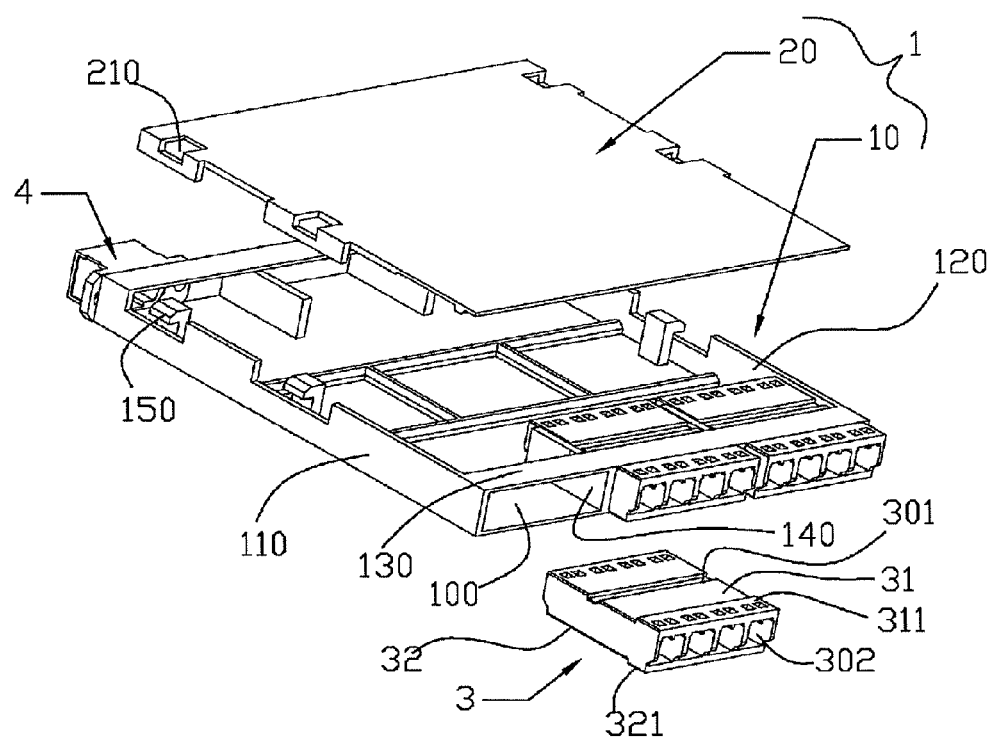
FIG. 1 is a schematic exploded view of a high density optical fiber switch module according to a preferable embodiment of the present invention.
Figure 2:
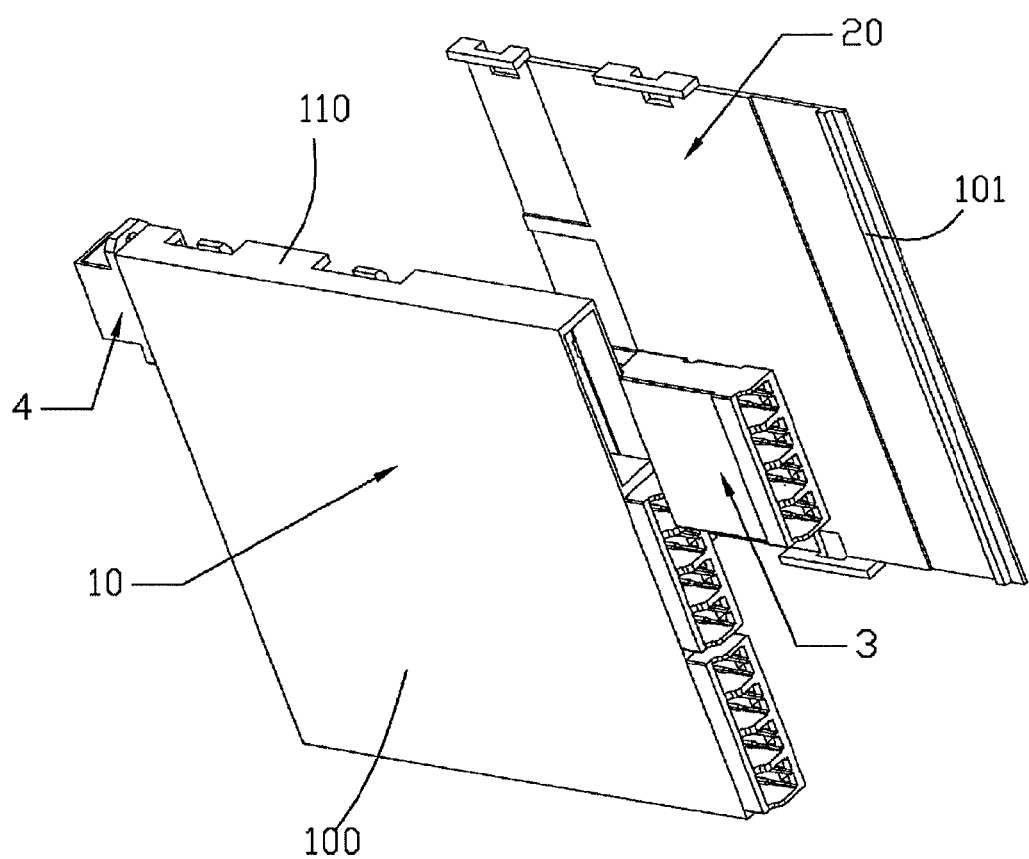
FIG. 2 is another schematic exploded view of the high density optical fiber switch module according to the preferable embodiment of the present invention.

FIGS. 1 and 2 show schematic views of an optical fiber switch module according to an preferable embodiment of the present invention, and the optical fiber switch module is configured for the conversion from MTP connectors to duplex optical fiber connectors, for example, for the conversion from two 12-core MTP connectors to twelve dual-core optical fiber connectors. As shown, the optical fiber switch module includes a box body 1, MTP connectors 4 are arranged at the rear panel of the box body 1, while 3 optical fiber adaptors 3 are arranged at the front panel of the box body 1, with each of the optical fiber adaptors 3 containing 4 sockets 302 for receiving duplex optical fibers.

Figure 3:
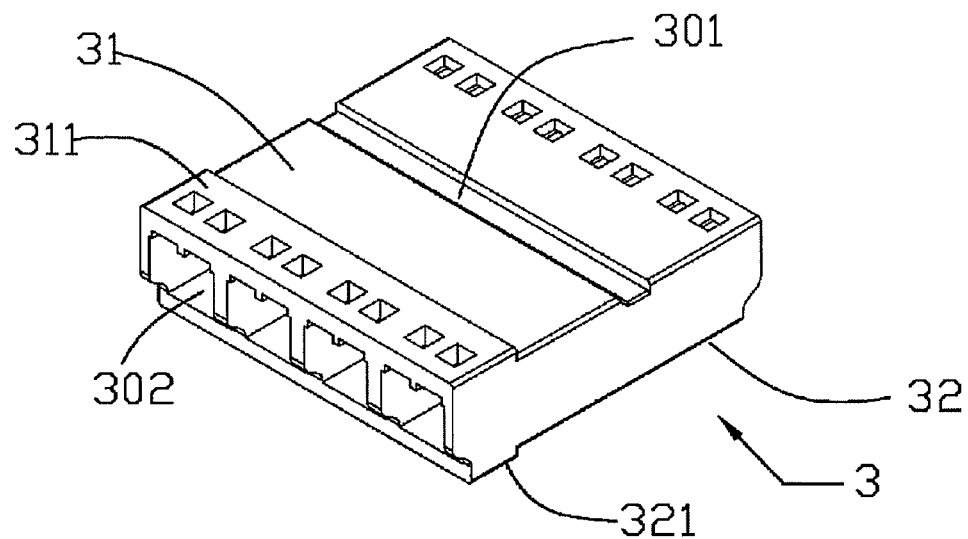
FIG. 3 is a schematic view of an optical fiber adaptor of the high density optical fiber switch module according to a preferable embodiment of the present invention.
Figure 4:
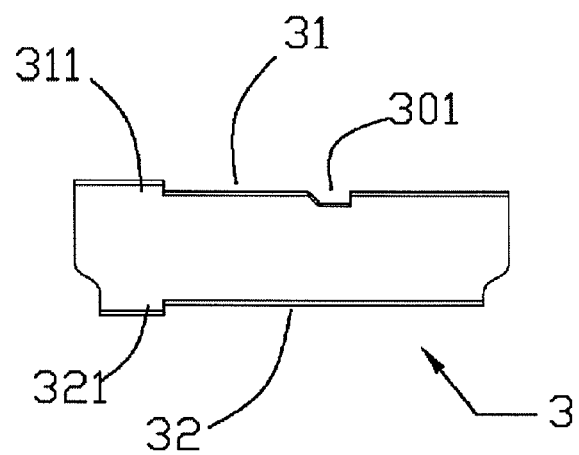
FIG. 4 is a schematic side view of the optical fiber adaptor of the high density optical fiber switch module according to a preferable embodiment of the present invention.

As shown in FIGS. 1 and 2, in the present embodiment, the box body 1 includes a base housing 10 and a cover 20 detachably connected with the base housing 10. The base housing 10 includes a base plate 100, and a left side wall 110 and a right side wall 120 which are arranged opposite to each other on both lateral sides of the base plate 100. A transverse barrier bar 130, which is connected to the left and right side walls 110 and 120 and parallel to the base plate 100, is arranged at the front end of the base housing 10, so that the transverse barrier bar 130, the left side wall 110, the right side wall 120, and the base plate 100 together form a frame at the front end of the base housing 10. The optical fiber adaptor 3 may be inserted into the frame to be accommodated between the transverse barrier bar 130 and the base plate 100. Because the transverse barrier bar 130 is relatively long and hence likely deformed in the case of multiple optical fiber adaptors, at least one vertical barrier plate 140 for separating the optical fiber adaptors 3 is arranged between the transverse barrier bar 130 and the base plate 100, to avoid such deformation. Here, one vertical barrier plate 140 is arranged between two adjacent optical fiber adaptors 3, and the vertical barrier plate 140 is formed integrally with the transverse barrier bar 130 and the base plate 100, to ensure a sufficient strength of the frame. As shown in FIGS. 3 and 4, to quickly position the optical fiber adaptor 3 during its assembly, stop steps 311 and 321 are arranged on the top surface 31 and the bottom surface 32 of the optical fiber adaptor 3, respectively, where the stop step 311 on the top surface 31 is adapted to abut against the end face of the transverse bather bar 130, and the stop step 321 on the bottom surface 32 is adapted to abut against the end face of the base plate 100. It shall be noted that the stop of the optical fiber adaptor 3 may be implemented by either of the stop steps 311 and 321, and preferably by both the stop steps 311 and 321 on the top and bottom surfaces for the better stop of the optical fiber adaptor 3.

With reference to FIGS. 3 and 4, in the present embodiment, a first positioning groove 301 is provided on the top surface 31 of the optical fiber adaptor 3 and extends along a direction that is perpendicular to a direction in which an optical fiber plug is inserted into the optical fiber adaptor 3, and a first positioning protrusion 101 matching with the first positioning groove 301 is provided on the inner surface of the cover 20, so that when the cover 20 is placed on the base housing 10, the first positioning protrusion 101 is latched within the first positioning groove 301 to fix the optical fiber adaptor 3 at the front end of the fox body 1. The cross section of the first positioning groove 301 may have a diversified shape, preferably a right-angled trapezoid, a lateral side of which that is close to the front end of the optical fiber adaptor 3 is a sloped side, thus the cross section of the first positioning protrusion 101 has a shape of right-angled trapezoid, in this case, the sloped face of the first positioning protrusion 101 has an effect of guiding when the optical fiber adaptor 3 is inserted from the front end of the box body 1, and the vertical face of the first positioning protrusion 101 that is opposite to the sloped face has an effect of preventing retreatment of the optical fiber adaptor 3.

It shall be understood that the first positioning groove 301 may be alternatively arranged on the bottom surface 32 of the optical fiber adaptor 3 in the present embodiment, and accordingly a matching positioning protrusion is provided on the base plate 100 (particularly, on the inner surface of the base plate 100). Furthermore, based on the present embodiment, an additional second positioning groove may be arranged on the bottom surface of the optical fiber adaptor 3 and an additional second positioning protrusion matching with the second positioning groove may be correspondingly arranged on the inner surface of the base plate 100, where the second positioning groove and the first positioning groove 101 are preferably arranged alternately to prevent the degradation of the strength of the optical fiber adaptor.

In the present embodiment, the cover 20 and the base housing 10 are coupled in a snap locking manner. Particularly, latching slots 210 are provided at both lateral sides of the cover 20, and latching hooks 150 matching with the latching slots 210 are provided at both lateral sides of the base housing 10, so that the latching hooks 150 may be locked in the latching slots 210. It shall be understood that the cover 20 and the base housing 10 may be coupled in another detachable manner through bolts, for example.

It shall be understood that the optical fiber switch module of the present invention is not limited to the conversion from the MTP connectors to the dual-core LC connectors, but may be applied to conversions between other optical fiber connectors. Further, the number of sockets of the optical fiber adaptor and the number of the optical fiber adaptors are not limited to those as disclosed in the present embodiment, but may be selected as will.

In the optical fiber switch module of the present invention, the positioning groove is arranged on the surface of the optical fiber adaptor, and the positioning protrusion matching with the positioning groove is correspondingly arranged on the inner surface of the box body of the optical fiber switch module, so that the optical fiber adaptor may be fixedly attached when the positioning protrusion is latched within the positioning groove. Because the optical fiber adaptor does not include any connecting flange or elastic latching arm, the size of the optical fiber adaptor may be effectively reduced, thereby improving the density of optical fiber connections.

The embodiments of the present invention have been described in detail above in connection with the accompanying drawings, but these embodiments are not intended to limit the scope of the present invention. All the specific embodiments are illustrative, and any equivalent variants made by those skilled in the art in light of the present invention without departing from the principle and scope of the present invention should be included within the claimed scope of the present application.

The invention claimed is:

1. A high density optical fiber switch module, comprising: a box body, wherein the box body comprises a base housing and a cover detachably connected with the base housing and at least one optical fiber adaptor is arranged at a front end of the box body, a first positioning groove is provided on a top surface or a bottom surface of the optical fiber adaptor and extended along a direction that is perpendicular to a direction in which an optical fiber plug is inserted into the optical fiber adaptor, and a first positioning protrusion matching with the first positioning groove is provided on the inner surface of the box body, so that the optical fiber adaptor is fixed at the front end of the box body when the first positioning protrusion is latched within the first positioning groove; and the first positioning groove is located on the top surface of the optical fiber adaptor, and the first positioning protrusion is located on an inner surface of the cover.

2. The high density optical fiber switch module of claim 1, wherein the base housing comprises a base plate, and a left side wall and a right side wall which are arranged opposite to each other on both lateral sides of the base plate, a transverse barrier bar, which is connected to the left and right side walls and parallel to the base plate, is arranged at a front end of the base housing, so that the optical fiber adaptor is accommodated between the transverse barrier bar and the base plate.

3. The high density optical fiber switch module of claim 2, wherein, a vertical barrier plate separating the optical fiber adaptors is arranged between the transverse barrier bar and the base plate.

4. The high density optical fiber switch module of claim 2, wherein, stop steps are arranged on a top surface and a bottom surface of the optical fiber adaptor, respectively, the stop step on the top surface is adapted to abut against an end face of the transverse barrier bar, and the stop step on the bottom surface is adapted to abut against an end face of the base plate.

5. The high density optical fiber switch module of claim 1, wherein, the cross section of the first positioning groove has a shape of right-angled trapezoid, a lateral side of which that is close to the front end of the optical fiber adaptor is a sloped side, and the cross section of the first positioning protrusion has a shape of right-angled trapezoid.

6. The high density optical fiber switch module of claim 1, wherein, the cover and the base housing are coupled in a snap locking manner, latching slots are provided at both lateral sides of the cover, latching hooks matching with the latching slots are provided at both lateral sides of the base housing, and the latching hooks are configured to be locked in the latching slots.

7. The high density optical fiber switch module of claim 1, wherein, a second positioning groove is arranged on the bottom surface of the optical fiber adaptor and a second positioning protrusion matching with the second positioning groove is correspondingly arranged on the inner surface of the base plate of the base housing, and the second positioning groove and the first positioning groove are arranged alternately.

8. The high density optical fiber switch module of claim 1, wherein, the optical fiber adaptor is provided with a plurality of sockets for receiving optical fiber plugs.

9. The high density optical fiber switch module of claim 8, wherein, the optical fiber plugs are dual-core optical fiber plugs.

* * * * *